United States Patent
Oikarinen

(10) Patent No.: US 10,929,810 B1
(45) Date of Patent: Feb. 23, 2021

(54) BIN CONTENT IMAGING AND CORRELATION USING AUTOMATED AERIAL VEHICLES

(71) Applicant: Amazon Technologies, Inc., Seattle, WA (US)

(72) Inventor: Matti Juhani Oikarinen, Wilmington, MA (US)

(73) Assignee: Amazon Technologies, Inc., Seattle, WA (US)

( * ) Notice: Subject to any disclaimer, the term of this patent is extended or adjusted under 35 U.S.C. 154(b) by 1 day.

(21) Appl. No.: 16/268,449

(22) Filed: Feb. 5, 2019

Related U.S. Application Data

(62) Division of application No. 15/991,964, filed on May 29, 2018, now Pat. No. 10,223,670, which is a division of application No. 14/243,698, filed on Apr. 2, 2014, now Pat. No. 10,002,342.

(51) Int. Cl.
| | |
|---|---|
| G06Q 10/08 | (2012.01) |
| G06K 9/00 | (2006.01) |
| G05D 1/04 | (2006.01) |
| H04N 7/18 | (2006.01) |

(52) U.S. Cl.
CPC ........... *G06Q 10/087* (2013.01); *G05D 1/042* (2013.01); *G06K 9/00805* (2013.01); *H04N 7/185* (2013.01)

(58) Field of Classification Search
None
See application file for complete search history.

(56) References Cited

U.S. PATENT DOCUMENTS

| | | | |
|---|---|---|---|
| 5,530,330 | A | 6/1996 | Baiden et al. |
| 6,163,745 | A | 12/2000 | Purchase et al. |
| 6,470,989 | B1 | 10/2002 | Puputti et al. |
| 7,392,151 | B2 | 6/2008 | Mäkelä |
| 7,725,232 | B2 | 5/2010 | Mäkelä et al. |
| 7,899,599 | B2 | 3/2011 | Mäkelä et al. |
| 8,565,913 | B2 | 10/2013 | Emanuel et al. |

(Continued)

FOREIGN PATENT DOCUMENTS

| | | | |
|---|---|---|---|
| CN | 103274226 | * | 9/2013 |
| CN | 103274226 A | | 9/2013 |

(Continued)

OTHER PUBLICATIONS

Aerosight, "We Can Make Almost Anything Fly! DomiCopter Case Study", "http://www.aerosight.co.uk/bespoke-projects/", 2013, Publisher: Aerosight UAV Ltd.

(Continued)

*Primary Examiner* — Fateh M Obaid
(74) *Attorney, Agent, or Firm* — Athorus, PLLC

(57) ABSTRACT

This disclosure describes a system and method for utilizing an automated aerial vehicle for determining the content of items included in bins within a materials handling facility. In some implementations, the automated aerial vehicle may fly along a flight path past one or more bins (e.g., for imaging the bins to determine the content of the bins and for which the images may be correlated with the bins). The flight path for the automated aerial vehicle may be determined based on various parameters e.g., for most efficiently imaging the bins, etc.).

20 Claims, 9 Drawing Sheets

(56) References Cited

U.S. PATENT DOCUMENTS

| | | | | |
|---|---|---|---|---|
| 8,688,598 | B1* | 4/2014 | Shakes | G06Q 10/08 705/332 |
| 2009/0123091 | A1 | 5/2009 | Belz et al. | |
| 2009/0160975 | A1* | 6/2009 | Kwan | H04N 5/77 348/231.99 |
| 2012/0069131 | A1* | 3/2012 | Abelow | G06Q 10/067 348/14.01 |
| 2012/0191272 | A1 | 7/2012 | Andersen et al. | |
| 2016/0021344 | A1* | 1/2016 | Renkis | H04N 7/181 348/48 |
| 2017/0103265 | A1* | 4/2017 | Channah | G07C 9/37 |

FOREIGN PATENT DOCUMENTS

| | | | |
|---|---|---|---|
| WO | 2012173632 | A1 | 12/2012 |
| WO | WO2012173632 | A1 * | 12/2012 |

OTHER PUBLICATIONS

Angus Mackenzie, "Domino's DomiCopter Takes Pizza Delivery Airborne", "http://www.gizmag.com/dominos-domicopter-pizza-delivery/27814/", Jun. 6, 2013.

Connor Adams Sheets, "China Beat Amazon Prime Air to the Commercial Drone Delivery Market", "http://www.ibtimes.com/china-beat-amazon-prime-air-commercial-drone-delivery-market", Dec. 2, 2013.

Dezeen, "World's First Drone Delivery Service Launches in Australia", "http://vimeo.com/76965171", 2014, Publisher: Vimeo, LLC.

Gwynn Guilford Quartz, "Australia and China are Beating Amazon in the Commercial Drone Race", "http://www.nextgov.com/emerging-tech/2013/12/australia-and-china-are-beating-amazon", Dec. 2, 2013, Publisher: Nextgov.

Shanghalist China, "InCake UFO Delivery Service", "http://e.weibo.com/incake", Jul. 23, 2013.

Tacocopter, Inc., "Flying Robots Deliver Tacos to Your Location, Easy Ordering on Your Smartphone", "http://tacocopter.com/", Jan. 29, 2014.

U.S. Appl. No. 14/225,161, filed Mar. 25, 2014, Gur Kimchi et al., "Sense and Avoid for Automated Mobile Vehicles." (**copy not provided).

U.S. Appl. No. 61/896,065, filed Oct. 26, 2013, Daniel Buchmueller et al., "Automated Aerial Delivery Vehicle." (**copy not provided).

U.S. Appl. No. 61/901,431, filed Nov. 7, 2013, Daniel Buchmueller et al., "Automated Aerial Delivery Vehicle Routing and Safety." (**copy not provided).

* cited by examiner

BIN CONTENT IMAGING AND CORRELATION USING AUTOMATED AERIAL VEHICLES

CROSS-REFERENCE TO RELATED APPLICATIONS

This application is a divisional of and claims priority to U.S. application Ser. No. 15/991,964, filed May 29, 2018, entitled "Bin Content Determination Using Flying Automated Aerial Vehicles for Imaging," which is a divisional of and claims priority to U.S. application Ser. No. 14/243,698, filed Apr. 2, 2014, now U.S. Pat. No. 10,002,342, entitled "Bin Content Determination Using Automated Aerial Vehicles," both of which are incorporated herein by reference in their entirety.

BACKGROUND

Retailers, wholesalers, and other product distributors typically maintain an inventory of various items that may be ordered, purchased, leased, borrowed, rented, viewed, etc., by clients or customers. For example, an e-commerce website may maintain inventory in a fulfillment center. When a customer orders an item, the item is picked from inventory, routed to a packing station, packed and shipped to the customer. Likewise, physical stores maintain inventory in customer accessible areas (e.g., shopping area) and customers can pick items from inventory and take them to a cashier for purchase, rental, etc. Many of those physical stores also maintain inventory in a storage area, or fulfillment center, that can be used to replenish inventory located in the shopping areas and/or to satisfy orders for items that are placed through other channels (e.g., e-commerce). Other examples of entities that maintain inventory include libraries, museums, rental centers, and the like. In many instances, the inventory is stored in bays. The bays may be divided into shelves to increase the total storage capacity of the bay. Likewise, the shelves may be divided into bins, with each bin containing content of one or more items.

BRIEF DESCRIPTION OF THE DRAWINGS

The detailed description is set forth with reference to the accompanying figures. In the figures, the left-most digit(s) of a reference number identifies the figure in which the reference number first appears. The use of the same reference numbers in different figures indicates similar or identical items or features.

Figure 1:
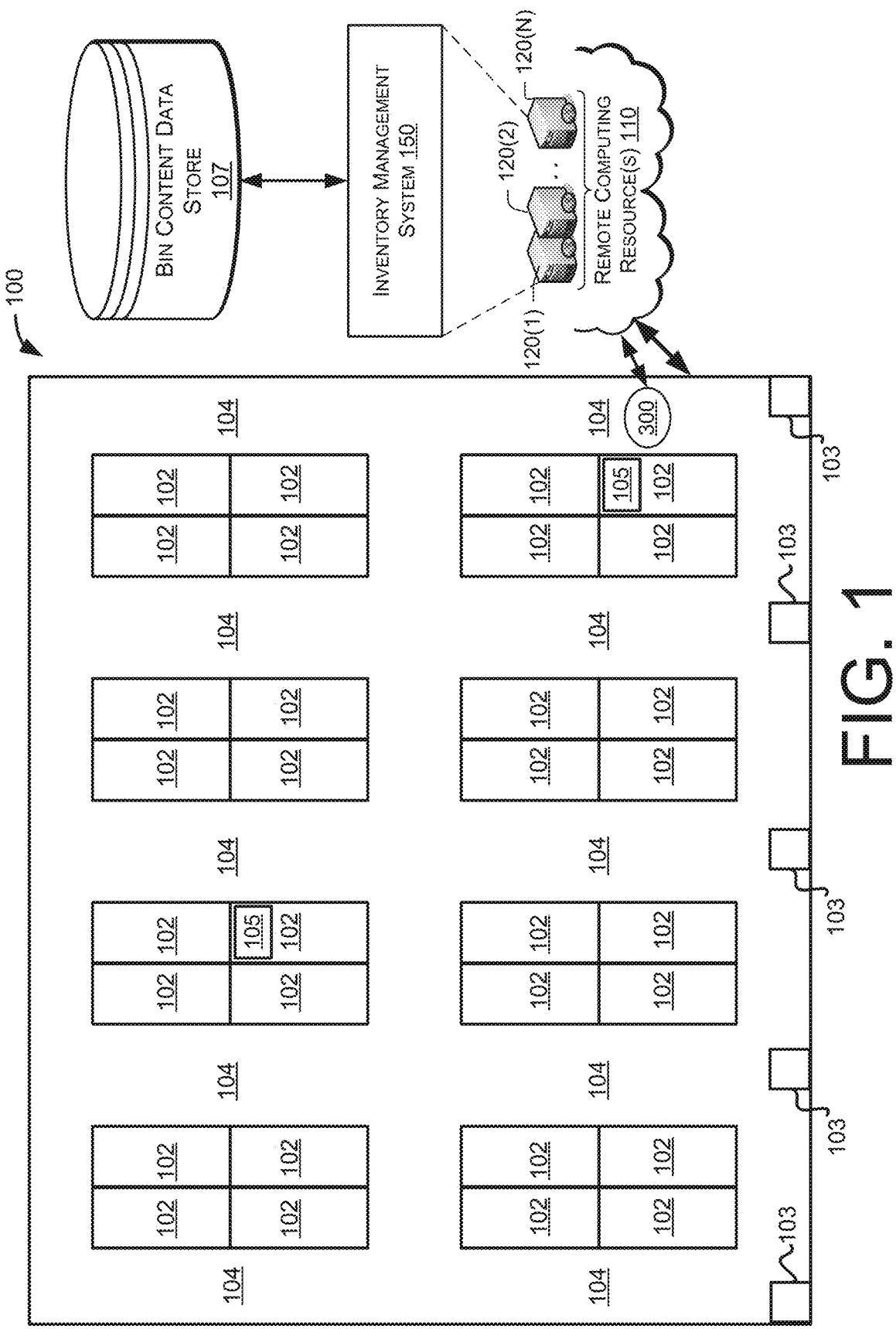
FIG. 1 is a block diagram illustrating top down view of a storage area within a materials handling facility, according to some implementations.

While implementations are described herein by way of example, those skilled in the art will recognize that the implementations are not limited to the examples or drawings described. It should be understood that the drawings and detailed description thereto are not intended to limit implementations to the particular form disclosed, but on the contrary, the intention is to cover all modifications, equivalents and alternatives falling within the spirit and scope as defined by the appended claims. The headings used herein are for organizational purposes only and are not meant to he used to limit the scope of the description or the claims. As used throughout this application, the word "may" is used in a permissive sense (i.e., meaning having the potential to), rather than the mandatory sense (i.e., meaning must). Similarly, the words "include," "including," and "includes" mean including, but not limited to.

DETAILED DESCRIPTION

This disclosure describes a system and method for utilizing an automated aerial vehicle for determining the content of inventory items included in a bin within a materials handling facility. Multiple bins may be on shelves of bays within a materials handling facility and the bins are used to store one or more items of inventory. Agents (referred to herein, for example, as "picking agents" or "stowing agents") receive instructions as to which bin to pick an inventory item from, or into which bin to stow an inventory item. Bin information identifying each item stored in the bin is maintained by an inventory management system and utilized to maintain inventory information (e.g., item quantity and locations), provide stowing agents with instructions on where to stow an inventory item and to provide instructions to picking agents identifying the bin from which an inventory item is to be picked.

An initial or are-determination of the content of inventory items included in bins of a materials handling facility may require significant resources and time, depending on the size of the materials handling facility. Examples of instances where the content may need to be initially or re-determined include when a database for a materials handling facility or a bay is first established, a corruption of an inventory database, an independent inventory assessment service, etc. In addition, as items are picked, moved and/or stowed at different locations within a materials handling facility, it is difficult to maintain an accurate ongoing record of items included in a bin. For example, an agent may pick the wrong item from a bin, stow an item into the wrong bin, an item may fall out of a bin and be returned to a different bin, etc. Because of these inconsistencies, it is necessary to periodically determine the content of inventory items included in bins within the materials handling facility. Typical solutions include an agent determining the content by manual inspection. In some instances, the agent may determine the content by verifying that the items within the bin correspond with the bin information stored by the materials handling facility. However, as materials handling facilities grow in size, these solutions require a large number of agents to complete. In addition, with the increase in the number of bins with content to be determined, the likelihood of an error increases.

In one implementation, an automated aerial vehicle (also referred to herein as an "AAV") that includes one or more image capture devices (e.g., cameras) is configured to capture images of bins as the AAV flies along a flight path down rows of bays. The AAV may also include one or more illumination elements (e.g., lights) that illuminate the bins as images are captured. As the AAV flies down rows of bays, images of the bins included in the bays may be automatically captured and processed to determine the content included in each bin.

In one implementation, both the content and the identity of the bins may be determined through computer imaging programs. For example, as an initial determination the bays and bins themselves may include visual identifiers (e.g., barcodes, hokodes, QR codes, colors, shapes, characters, images, sizes, or any other characteristics of or on the bays or bins) that can he used to determine the bin identity and/or location within the bay, and which may he used to determine which images correspond with which bins of the bay. In addition, in one implementation the computer imaging program may include machine learning for content determination, and may search for visual identifiers (e.g., barcodes, bokodes, QR codes, colors, shapes, characters, images, sizes, or any other characteristics of or on the inventory items) that can be used to determine the content of the bin. In an implementation where machine learning is utilized, human agents may review the images and content determinations until the process achieves sufficient accuracy. A confidence score may be associated with the content determinations in order to target agent review more efficiently. For example, content determinations with low confidence scores may be sent for agent review while those with high confidence scores may not be sent for review.

In one implementation, the bin content may also or alternatively be determined by identifying images of a bin and comparing the images with stored images of the bin that were previously captured and for which the bin content in the stored images is already known. For example, images of bins may be captured every night and images from the current night may be correlated with bins and compared to images captured the previous night that are also correlated with the bins. Based on a comparison of the images, it may be determined whether the content of a bin has changed. Likewise, the inventory management system may determine if a change to the content of the bin was expected or unexpected (e.g., were pick and/or stow instructions relating to the bin issued to an agent). If it is determined that a content change occurred that was not expected, or if a content change did not occur that was expected, an agent may be instructed to determine the content of the bin.

It will be appreciated that by automatically processing images to determine the content of bins and/or determining if the contents of bins are accurate or not accurate as compared to prior stored images of the bins, the amount of agent resources and time needed for bin content determination is greatly reduced. For example, in many materials handling facilities more than 85% of the bins either have not changed or it can he determined through image processing that the actual content change corresponds with an expected content change. By eliminating 85% of the bins from manual agent review, the cost and time required to determine bin content are greatly reduced. Also, by reducing the bin content determination to only those bins that are determined to likely not be accurate, manual review by agents is more focused and thus has a lower likelihood of the agent introducing an error.

In various implementations, as an AAV flies along a flight path for taking images of bins, the AAV may additionally be programmed to take continuous video or sequences of images of other facility areas (e.g. corridors, floors, etc.) outside of the bins. Such images may be analyzed for various purposes (e.g., detection of items dropped on floors, security video, tracking of products in transit, detection of smoke/fire/other hazards, tracking of entities such as humans, machines, etc.). The review of the images may include computer vision analysis e.g., for object/facial recognition) and/or may include comparing the images to earlier images or representations of the same area to identify differences. Particular areas may be selected for analysis and may be the focus of additional imaging. For example, if a particular area of the materials handling facility is known to have certain issues (e.g., missing items, misplaced items, damaged items, unexpected time delays, unauthorized people in certain areas, etc.), images of the area may be obtained and analyzed to attempt to determine a cause.

in various implementations, as an AAV flies along a flight path for taking images of bins, the AAV and/or materials handling facility may include additional sensors for detecting obstacles along the flight path (e.g., humans, signs, walls, bays, etc.). In one implementation, if it is determined that there is a human or other obstacle in the current row of the flight path that should not be flown near or around, the flight path may be modified to cause the AAV to return to the current row at a later time. It will be appreciated that by modifying the flight path to return to the current row at a later time, no risk is posed to a human working in an area where an AAV was otherwise scheduled to be flying for obtaining images of bins. If a non-human obstacle is present, the flight path of the AAV may be modified to fly over, under or around the current obstacle, while still obtaining images of the bins in the current row. If the obstacle prevents the imaging of certain bins, a report may be provided from the AAV to an inventory management system.

As used herein, a materials handling facility may include, but is not limited to, warehouses, distribution centers, cross-docking facilities, order fulfillment facilities, packaging facilities, shipping facilities, rental facilities, libraries, retail stores, wholesale stores, museums, or other facilities or combinations of facilities for performing one or more functions of material (inventory) handling. A bay, as used herein, is any physical structure or location at which one or more items of inventory may be stored or otherwise located. A bay may be divided into one or more bins in which content (e.g., items) is stored. For example, a bay may include a series of shelves and the shelves may be divided into one or more bins, as illustrated and discussed in further detail with respect to FIG. 2. Alternatively, the bay and the bin may both constitute a location within the materials handling facility for storing a large item or a large quantity of items (e, g., pallet of items). In such an instance, the bay may include only a single bin. As will be appreciated, a bay includes at least one bin, but may include any number of bins. In some implementations, a bay may be mobile and configured such that it can be transported by a mobile drive unit.

FIG. 1 is a block diagram illustrating a top down view of a storage area 100 within a materials handling facility configured to store inventory items, according to some implementations. As shown, the storage area includes bays 102 for storing inventory items. Any number, type and/or size of bay may be included in the storage area. As shown, multiple bays 102 may be arranged adjacent to one another and/or across from one another to establish a series of rows within the storage area 100. In this example, the bays 102 are arranged in rows 104 such that an agent and/or an AAV 300 may progress through the rows. For example, an agent may progress through the rows 104, pick items from bins of the bays 102, and/or store items in bins of the bays 102. Similarly, as will be described in more detail below, an AAV 300 may fly down the rows 104 and take images of the bins of the bays 102 for determining the content of the bins. In some implementations, a landing area 105 for an AAV 300 may be designated on top of one or more of the bays 102, as will be described in more detail below with respect to FIG. 2.

In one implementation, one or more AAVs 300 may have permanent installations in a materials handling facility (e.g., including the designated landing areas 105 which may include power and/or data connection capabilities) in order to provide frequent inventory content determinations. In another implementation, one or more AAVs 300 may be deployed only temporarily to a materials handling facility when needed. In various implementations, temporary usage may be suitable for reducing cost across multiple materials handling facilities, in particular depending on the size of the materials handling facilities and the speed of the AAVs 300. Different types of AAVs 300 may have different capabilities, and a fast AAV 300 with long battery life and multiple image capture devices (e.g., cameras) may be able to perform inventory content determination more quickly than a less equipped AAV 300. In various implementations, the number, size and nature of the materials handling facilities may thus determine the required number and capabilities of the AAVs 300 for performing the inventory content determinations.

The materials handling facility may be configured to receive different kinds of inventory items from various suppliers, vendors, etc., and to store those items until a customer orders or retrieves one or more of the items. In various implementations, items may include merchandise, commodities, perishables, or any suitable type of item depending on the nature of the enterprise that operates the materials handling facility.

Upon being received from a supplier, items may be prepared for storage in the storage area 100. For example, in some implementations, items may be unpacked or otherwise rearranged, and the inventory management system 150 (which, as described below, may include one or more software applications executing on a computer system) may be updated to reflect the type, quantity, condition, cost, location or any other suitable parameters with respect to newly received items. It is noted that items may be stocked, managed or dispensed in terms of countable, individual units or multiples of units, such as packages, cartons, crates, pallets or other suitable aggregations. Alternatively, some items such as bulk products, commodities, etc., may be stored in continuous or arbitrarily divisible amounts that may not be inherently organized into countable units. Such items may he managed in terms of measurable quantities such as units of length, area, volume, weight, time duration or other dimensional properties characterized by units of measurement. Generally speaking, a quantity of an item may refer to either a countable number of individual or aggregate units of an item or a measurable amount of an item, as appropriate.

After arriving and being prepared for storage, items may be stored within the storage area 100. In some implementations, like items may be stored or displayed together in one or more bins of a bay, or adjacent bins, such that all items of a given kind are stored in one location. In other implementations, like items may be stored in different locations. For example, to optimize retrieval of certain items having high turnover within a large physical facility, those items may be stored in several different bins throughout the storage area 100 to reduce congestion that might occur at a single point of storage.

When a customer order specifying one or more items is received, the corresponding items may be selected or "picked" from a bin within the storage area 100. In various implementations, item picking may range from manual to completely automated picking. In other implementations, materials handling facility employees (agents) may pick items using written or electronic pick lists derived from customer orders and place picked items into a tote, cart, etc., as the materials handling facility agent progresses through the storage area 100.

Alternatively, or in addition thereto, some or all of the bays may be mobile, also referred to herein as inventory holders, and configured so that a mobile drive unit (not shown can retrieve the bay and deliver it to an operating location 103. When the bay arrives at the operating location, an agent located at the operating location may perform one or more operations e.g., picking and/or stowing). After the agent has completed operations, the bay may be removed from the operating location by the mobile drive unit and returned to a storage location, taken to another operating location, etc.

As discussed in more detail below, as items are picked and/or as inventory within the storage area is replenished with new inventory, the actual items in a bin may begin to vary from the virtual inventory maintained by the inventory management system 150 as to what items should be included in the bin. For example, if new inventory is being added to a bin within the storage area, the agent may place the item in an adjacent bin rather than the bin in which the item is expected to be stored. As another example, an item may fall from a bin and when replaced, it may be placed in a different bin. Likewise, in other instances, an agent may pick the wrong item from the bin, resulting in the stored bin inventory information not matching the actual bin inventory.

In each such instance, the actual content (items) included in the bins within the materials handling facility change and the stored bin content information needs to be updated accordingly. Unfortunately, the stored bin content information may not always be updated by the agent making the change, or any other agent, and/or the update may be done incorrectly. To resolve this error, the content of the bins within the storage area 100 may need to be determined so that the stored bin content information utilized by the inventory management system 150 can be correctly maintained.

The storage area 100 may also include or be in communication with the inventory management system 150 that is configured to receive and/or provide information to agents, AAVs 300, mobile drive units, and/or other entities within the storage area 100 or other areas of the materials handling facility. Generally, the inventory management system 150 may include one or more communication devices that facilitate wireless communication (e.g., Wi-Fi, NFC, Bluetooth) between the inventory management system 150 and the AAVs 300 (discussed below).

The inventory management system 150 may be implemented on one or more computing resources. The computing resources may be local and/or remote. As illustrated, the inventory management system 150 is implemented on remote computing resources 110, which may include one or more servers 120(1), 120(2), . . . , 120(N) and may, in some instances, form a portion of a network-accessible computing platform implemented as a computing infrastructure of processors, storage, software, data access, etc. The computing resources 110 do not require end-user knowledge of the physical location and configuration of the system that delivers the services. Common expressions associated for the remote server system 120 include "on-demand computing," "software as a service (SaaS)," "platform computing," "network-accessible platform," "cloud services," "data centers," and so forth.

The computing resources 110 may also include a bin content data store 107, and/or other data stores. As discussed further below, the data stores may include lists, arrays, databases, and other data structures used to provide storage and retrieval of data. Likewise, while the disclosure describes multiple data stores, in some implementations, the data stores may be configured as a single data store or multiple data stores.

The bin content data store 107 contains stored bin content information, and may also include bay configuration information. Stored bay configuration information may include information about each bay, such as the number and/or arrangement of bins within the bay, the location of the bay within the storage area 100, a virtual representation of the bay configuration, the identifiers associated with the bay, etc.

The bin content data store 107 may be integrated with the inventory management system 150 or otherwise communicatively coupled with the inventory management system 150. For example, the bin content data store 107 may be located at a remote computing resource and communicatively coupled with the server system 120 that implements the inventory management system 150. In some implementations, the bin content data store 107 may include one or more CD-RW/DVD-RW drives, hard disk drives, solid-state drives, tape drives, or other storage devices that are utilized to store digital content and information.

The inventory management system 150 may utilize antennas within the materials storage area 100 of the materials handling facility to create a local wireless network (e.g., Wi-Fi) so that an AAV 300 can connect to and communicate with the inventory management system 150. Likewise, in instances when one or more of the components of the inventory management system 150 are remote from the materials handling facility and/or the storage area 100, those components may communicate with other components of the inventory management system 150 and/or the AAV 300 via a network.

The organization and operation of the storage area 100 within a materials handling facility described above is given as an example. In other implementations, a materials handling facility and/or storage area may be arranged differently and operate differently than described above.

Figure 2:
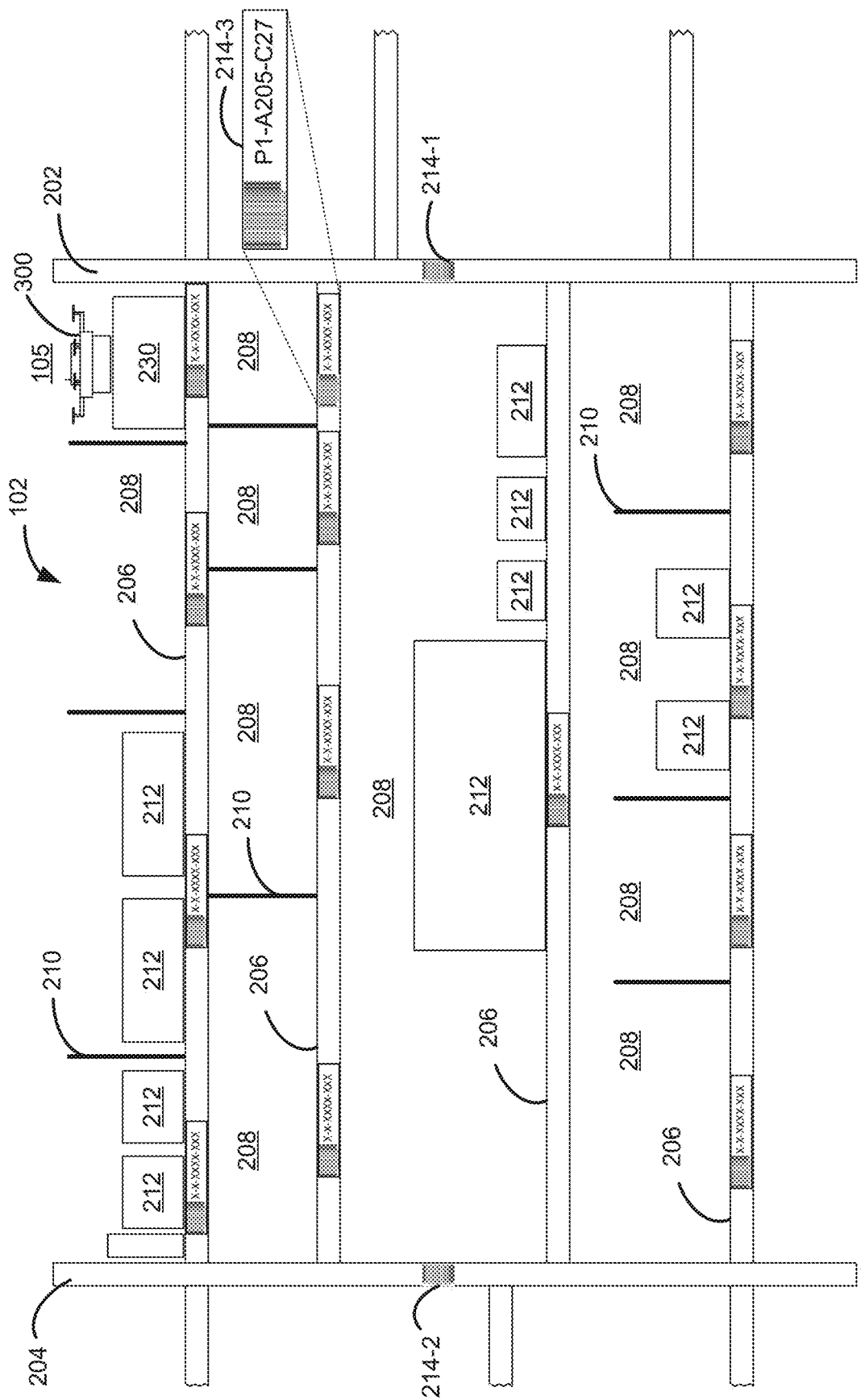
FIG. 2 is a block diagram of a bay with bins within the storage area, according to some implementations.

FIG. 2 is a block diagram of a side view of a bay 102 that includes multiple bins 208, according to some implementations. In this example, the bay 102 includes two ends 202, 204 adjacent to which additional bays with shelves extend. The bay 102 in this example includes four shelves 206. A bay may include any number of shelves or no shelves (e.g.. the bay may just be a location within the storage area 100). Likewise, as illustrated, the shelves 206 of the bay 102 may include any number of bins 208. Bins 208 may be established through the use of dividers 210 that provide a physical separation between two different sections of the bay. Alternatively, if a shelf does not include a divider, the entire shelf may be considered a bin. Likewise, if the bay does not include any shelves or dividers, the bay may be considered as a single bin. The dividers 210 may be any physical structure used to divide or otherwise separate a bay. For example, a divider 210 may be a metal or plastic divider that can be affixed to a shelf such that it is perpendicular to the shelf. Alternatively, the divider may be a piece of corrugate that is folded or placed on the shelf to divide or otherwise separate the shelf.

Items 212 of different sizes and/or shapes may be stored in bins of a bay. As discussed above, a bin may include one or more items 212 of the same type and/or items of different types, shapes and/or sizes. A group of items in a bin are collectively referred to herein as the bin content or content of the bin. Agents may stow and/or pick items from the bins and, in some implementations, may move, add and/or remove dividers from the bays thereby altering the configuration of the bay by increasing and/or decreasing the number of bins.

In some implementations, the organization of items in a bin may be done according to specified procedures. For example, as will be described in more detail below, an AAV 300 may be utilized to take images of a bin for determining the content of the bin. If the image is taken from in front of the bin, items in the back of the bin that are obscured from view by items in the front of the bin may result in inaccurate content determinations. The impact of this inaccuracy may be mitigated by arranging bin content to have identical items (e.g. items with the same UPC) arranged in front of one another, but never different products (e.g., with different UPCs) in front of one another. This mitigation allows computer vision algorithms for analyzing the images obtained by the AAV 300 to efficiently detect different products in the bin and provide a determination that each expected different item exists in the bin. Bins for which items are determined or suspected of obscuring other identical items may be tagged for later content verification. Later content verification may be performed by an agent and/or at a time when one of the suspected multiple items is picked and/or at another time appropriate for content verification.

As described above, a designated landing area 105 for an AAV 300 may be provided on top of a bay 102. In one implementation, the designated landing area 105 may be included within its own designated bin, and may include a landing platform 230. The landing platform and/or other parts of the landing area 105 may include charging and/or communication port capabilities for the AAV 300, wherein the AAV 300 may have navigation capabilities for landing on and connecting to such charging and/or communication port facilities (e.g., including plugs, guide rails, inductive capabilities, etc.). A determination of when an AAV 300 should land for charging may be made by the AAV 300 or by remote computing resources 110. The landing platform 230 may also provide a suitable separation and height for the landing area 105 so that the AAV 300 will not interfere with adjacent bins when it takes off or lands. In another implementation, a cover may be provided over the bay 102 on top of which the landing area 105 may be located.

In some implementations, the bay 102 may be identified by a visual identifier 214 located on the bay. The visual identifier 214 may be, for example, a barcode, bokode, QR code, color, shape, character, image, size, or any other identifier that can be used to identify the bay. In implementations where bays are arranged adjacent to one another and/or share vertical ends 202, 204, a visual identifier 214 may be positioned in a consistent manner so that it can be determined to which hay the visual identifier corresponds. For example, the visual identifier 214-1 for the bay 102 may be positioned on the right side of the bay 102 when facing the bay 102. This may be done for each bay. As such, the visual identifier 214-2 may correspond to the next adjacent bay.

Visual identifiers 214 may also be utilized to identify bins within each bay. For example, visual identifiers 214-3 each represent a bin 208 within the bay 102. When bins are added, removed or adjusted, the corresponding visual identifiers may be added, removed and/or adjusted to correspond to the modified, added and/or removed bin. In some implementations, the visual identifiers may include multiple types of identification. For example, visual identifier 214-3 may include both a barcode and human-readable information, in this example P1-A205-C27. P1 may represent the floor of the materials handling facility on which the bin is located, A205 may represent the row on which the bin is located and C27 may identify the bin.

Information about the bin, such as the bin location, size, shape, weight capacity, inventory items, etc., may also and/or alternatively be maintained in the bin content data store 107 accessible by the inventory management system 150. When the visual identifier is detected, it may be provided to the inventory management system 150 and the information associated with the visual identifier may be obtained.

In some implementations, the separation of bins may be determined by identifying the dividers that are included in the bays to establish the bins. For example, an image processing algorithm may be configured to identify the position of each divider 210 and thereby determine the separation of bins within a bay. This may be done alone or in conjunction with identifying the visual identifiers.

While the examples discussed herein utilize visual identifiers and/or dividers to detect and/or obtain information about bays and bins, in other implementations other forms of identifiers may be utilized. For example, active identifiers, such as radio frequency identifier tags ("RFID") may be used to provide information about bins and/or bays. In such an implementation, an active identifier reader may be utilized to detect the presence of active identifiers and to obtain information associated with the visual identifiers. Generally, the active tag reader may utilize one or more wireless technologies (e.g., RFID, near field communication ("NFC"), Bluetooth, infrared) to detect active identifiers.

As will be described in more detail below, similar techniques to those described above for identifying the bays and bins may also be utilized for identifying the inventory items 212. For example, the inventory items 212 may also include visual identifiers (e.g., barcodes, bokodes, QR codes, colors, shapes, characters, images, sizes, or any other characteristics of or on the inventory items) or other identifiers (e.g., RFID) that can be used to determine the inventory content of a bin. Alternatively or in addition, current images of bins may be compared to stored images of bins to determine bin content in accordance with any changes that have occurred. As will be described in more detail below, an AAV 300 may be utilized to obtain images and/or other data regarding the bins which may be analyzed to determine bin content.

Figure 3:
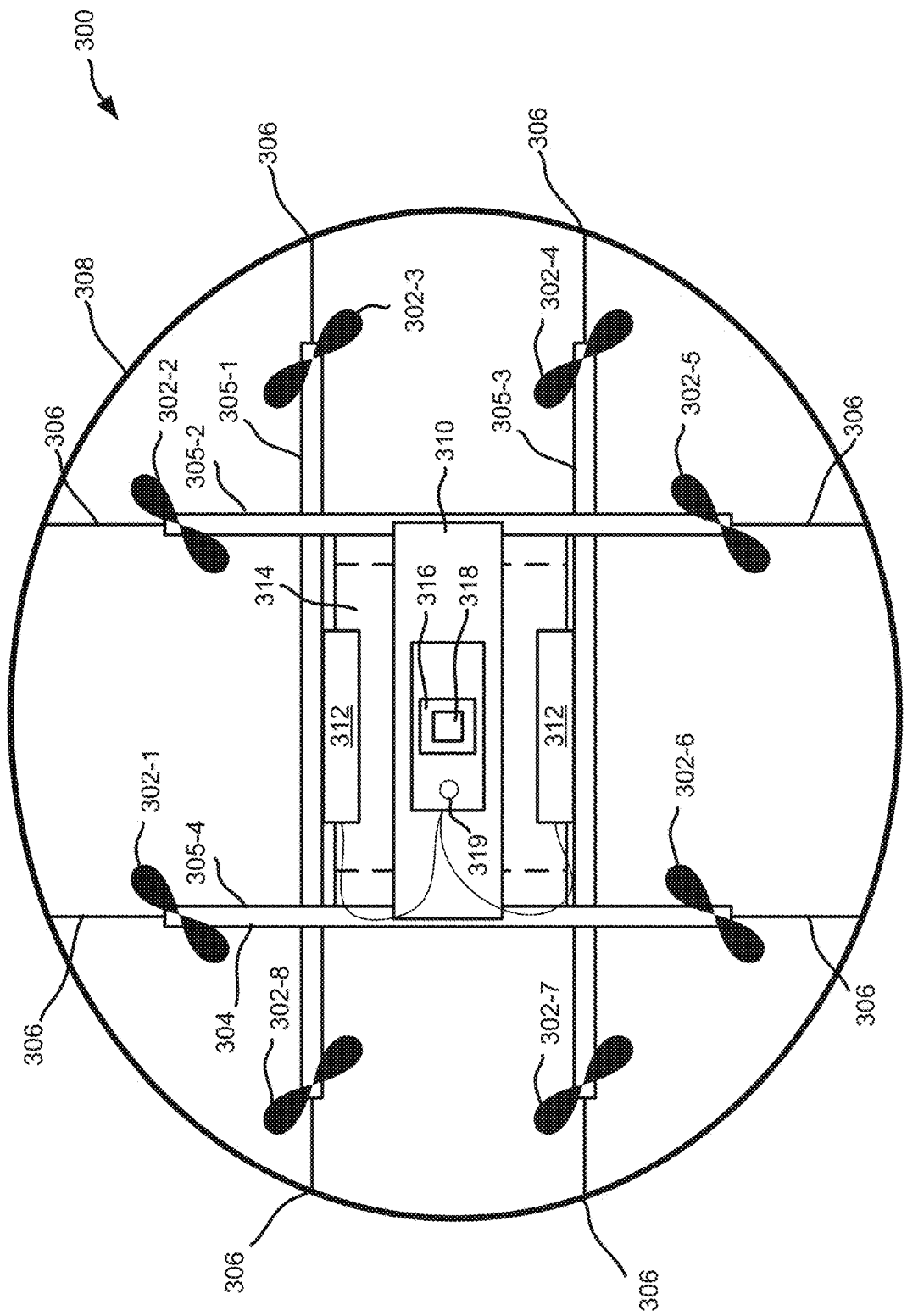
FIG. 3 depicts a block diagram of a top-down view of an automated aerial vehicle for determining the contents of bins, according to an implementation.

FIG. 3 illustrates a block diagram of a top-down view of an example AAV 300, according to some implementations. The AAV 300 may take many forms and the one provided in FIG. 3 is merely an example. As illustrated, the AAV 300 includes eight propellers 302-1, 302-2, 302-3, 302-4, 302-5, 302-6, 302-7, 302-8 spaced about the frame 304 of the AAV. The propellers 302 may be any form of propeller (e.g., graphite, carbon fiber) and of a size sufficient to lift the AAV 300 and any items (e.g., imaging devices, illumination devices, sensors, inventory, etc.) that are mounted on or engaged by the AAV 300 so that the AAV 300 can navigate through the air, for example, to take images of bins. While this example includes eight propellers, in other implementations, more or fewer propellers may be utilized. Likewise, in some implementations, the propellers may be positioned at different locations on the AAV 300. In addition, alternative methods of propulsion may be utilized. For example, fans, jets, turbojets, turbo fans, jet engines, and the like may be used to propel the AAV.

The frame 304 or body of the AAV 300 may likewise be of any suitable material, such as graphite, carbon fiber and/or aluminum. In this example, the frame 304 of the AAV 300 includes four rigid members 305-1, 305-2, 305-3, 305-4, or beams arranged in a hash pattern with the rigid members intersecting and joined at approximately perpendicular angles. In this example, rigid members 305-1 and 305-3 are arranged parallel to one another and are approximately the same length. Rigid members 305-2 and 305-4 are arranged parallel to one another, yet perpendicular to rigid members 305-1 and 305-3. Rigid members 305-2 and 305-4 are approximately the same length. In some implementations, all of the rigid members 305 may be of approximately the same length, while in other implementations, some or all of the rigid members may be of different lengths. Likewise, the spacing between the two sets of rigid members may be approximately the same or different.

While the implementation illustrated in FIG. 3 includes four rigid members 305 that are joined to form the frame 304, in other implementations, there may be fewer or more components to the frame 304. For example, rather than four rigid members, in other implementations, the frame 304 of the AAV 300 may be configured to include six rigid members. In such an example, two of the rigid members 305-2, 305-4 may be positioned parallel to one another. Rigid members 305-1, 305-3 and two additional rigid members on either side of rigid members 305-1, 305-3 may all be positioned parallel to one another and perpendicular to rigid members 305-2, 305-4. With additional rigid members, additional cavities with rigid members on all four sides may be formed by the frame 304. As discussed further below, a cavity within the frame 304 may be configured to include an engagement mechanism for the engagement and transport of items such as imaging devices, illumination devices, sensors, inventory, etc.

In some implementations, the AAV may be configured for aerodynamics. For example, an aerodynamic housing may be included on the AAV that encloses the AAV control system 310, one or more of the rigid members 305, the frame 304 and/or other components of the AAV 300. The housing may be made of any suitable material(s) such as graphite, carbon fiber, aluminum. etc. Likewise, in some implementations, the location and/or the shape of the engagement mechanism may be aerodynamically designed. For example, in some implementations, the engagement mechanism may be configured such that when an item is engaged it is enclosed within the frame and/or housing of the AAV 300 so that no additional drag is created during transport of the item by the AAV 300. In other implementations, the item may be shaped to reduce drag and provide a more aerodynamic design of the AAV and the item. For example, if the item is a container and a portion of the container extends below the AAV when engaged, the exposed portion of the container may have a curved shape.

The propellers 302 and corresponding propeller motors are positioned at both ends of each rigid member 305. The propeller motors may be any form of motor capable of generating enough speed with the propellers to lift the AAV 300 and any engaged item thereby enabling aerial transport of the item. For example, the propeller motors may each be a FX—4006-13 740 kv multi rotor motor.

Extending outward from each rigid member is a support arm 306 that is connected to a safety barrier 308. In this example, the safety barrier is positioned around and attached to the AAV 300 in such a manner that the motors and propellers 302 are within the perimeter of the safety barrier 308. The safety barrier may be plastic, rubber, etc. Likewise, depending on the length of the support arms 306 and/or the length, number or positioning of the rigid members 305, the safety barrier may be round, oval, or any other shape.

Mounted to the frame 304 is the AAV control system 310. In this example, the AAV control system 310 is mounted in the middle and on top of the frame 304. The AAV control system 310, as discussed in further detail below with respect to FIG. 4, controls the operation, routing, navigation, communication, object sense and avoid, engagement mechanism and input/output devices of the AAV 300.

Likewise, the AAV 300 includes one or more power modules 312. In this example, the AAV 300 includes two power modules 312 that are removably mounted to the frame 304. The power module for the AAV may be in the form of battery power, solar power, gas power, super capacitor, fuel cell, alternative power generation source, or a combination thereof. For example, the power modules 312 may each be a 6000 mAh Lipo battery. The power module(s) 312 are coupled to and provide power for the motors for the propellers 302, the AAV control system 310 and any other attached input/output devices, such as image capture devices 316 and illumination elements 318, as will be described in more detail below.

In some implementations, one or more of the power modules may be configured such that it can be autonomously removed and/or replaced with another power module while the AAV is landed. For example, when the AAV lands at a location (e.g., landing area 105), the AAV may engage with a charging member at the location that will recharge the power module.

As mentioned above, the AAV 300 may also include an engagement mechanism 314. The engagement mechanism may be configured to engage and disengage items and/or containers that hold items, such as imaging devices, illumination devices, sensors, inventory, etc. In this example, the engagement mechanism 314 is positioned within a cavity of the frame 304 that is formed by the intersections of the rigid members 305. The engagement mechanism may be positioned beneath the AAV control system 310. In implementations with additional rigid members, the AAV may include additional engagement mechanisms and/or the engagement mechanism 314 may be positioned in a different cavity within the frame 304. The engagement mechanism may be of any size sufficient to securely engage and disengage selected items. In other implementations, the engagement mechanism 314 may operate as the container, containing the item(s) to be engaged. The engagement mechanism 314 communicates with (via wired or wireless communication) and is controlled by the AAV control system 310. In various implementations, the interior of the engagement mechanism 314 may also include various power and/or communication connections for engaged devices (e.g., imaging devices, illumination devices, sensors, etc.)

While the implementations of the AAV discussed herein utilize propellers to achieve and maintain flight, in other implementations, the AAV may be configured in other manners. For example, the AAV may include fixed wings and/or a combination of both propellers and fixed wings. For example, the AAV may utilize one or more propellers to enable takeoff and landing and a fixed wing configuration or a combination wing and propeller configuration to sustain flight while the AAV is airborne. As another example, a lighter-than-air design may be utilized (e.g., airship, balloon, blimp, etc. filled with helium or other means of achieving sufficient lift and endurance). Safety considerations for such an AAV may favor the utilization of smaller propellers and slower movements as the AAV travels along a flight path (e.g., near humans).

Mounted on a top surface of the AAV 300 are one or more image capture devices 316 (e.g., cameras) positioned to capture images of bins as the AAV 300 passes by the bays. Also mounted on a top surface are one or more illumination elements 318 (e.g., lights), that are positioned to illuminate the bins as the images are captured. In various implementations, the illumination elements 318 may be mounted independently or on top of the image capture devices 316. While the image capture devices 316 and illumination elements 318 are illustrated as mounted in a central location, in other implementations they may be mounted at the peripheries or in any other locations on the AAV 300, or may be carried in the engagement mechanism 314 of the AAV. The AAV 300 may also include one or more distance determining elements (not shown) configured to determine a distance between a bin and the AAV 300 as well as a position of the bin with respect to the AAV 300.

The image capture devices 316 may be still cameras, video cameras, or any other form of image capture device that can be utilized to capture one or more images. In some implementations, the image capture devices 316 may be configured to capture images at a rate of speed or frequency that corresponds with the speed at which the AAV 300 is moving. For example, if the AAV 300 is moving three miles per hour as it passes between two bays, the image capture devices 316 capture images at a sufficient frequency such that all aspects of the bins are included in the series of captured images. In some implementations, the frequency of the image capture may be done such that the horizontal and/or vertical images overlap and when viewed together provide a full horizontal and/or vertical image of the bay. As noted previously, the power module(s) 312 may be configured to provide power to the image capture devices 316 and/or the AAV control system 310 while the AAV 300 is flying throughout the storage area 100 of the materials handling facility.

The one or more image captures devices 316 may be controlled by and/or in communication with the AAV control system 310. In various implementations, portions of the AAV control system 310 for communicating with the image capture devices 316 may be permanently part of the AAV 300, may be removably connected to the AAV 300, may be a remote computing system and/or a combination of both. The example of FIG. 3 shows the AAV control system 310 in wired communication with the image capture devices 316. However, in other implementations, the AAV control system 310 may wirelessly communicate with the image capture devices 316. Likewise, the AAV 300 may also include a communication component 319 (e.g., an antenna) that enables communication between a remote computing resource 110 (FIG. 1) and the AAV control system 310 and/or image capture devices 316. As discussed in further detail below, the captured images may be processed by the AAV control system 310, by the remote computing resource 110 and/or by a combination thereof.

As will be described in more detail below with respect to FIG. 4, the AAV control system 310 may also be connected (wired and/or wireless) with one or more storage devices that can be utilized to store images captured by the image capture devices 316 as the AAV 300 flies through the storage area 100. In some implementations, the storage device may store images until a certain number of images and/or a defined size of images have been stored. Once reached, the images may be transmitted via the antenna 319 to a remote computing resource. In some implementations, images may be stored on the storage device until all images of a bay have been captured. Once all images of a bay have been captured, the captured images may be transmitted to the inventory management system 150. In other implementations, images may be captured and stored on the storage device until all images for a row have been captured. Once captured, the images for the row may be transmitted to the inventory management system 150. At any of the above described points the images may be transmitted via the communication component 319 and/or the storage device may be removed from the AAV 300 and connected to the remote computing resources and/or the AAV 300 may be coupled to the remote computing resources e.g., through a port at a landing area 105).

In general, the AAV 300 may operate in conjunction with or may otherwise utilize or communicate with one or more components of the inventory management system 150. Likewise, components of the inventory management system 150 may generally interact and communicate with the AAV 300 and/or communicate with other components of the storage area 100.

Figure 4:
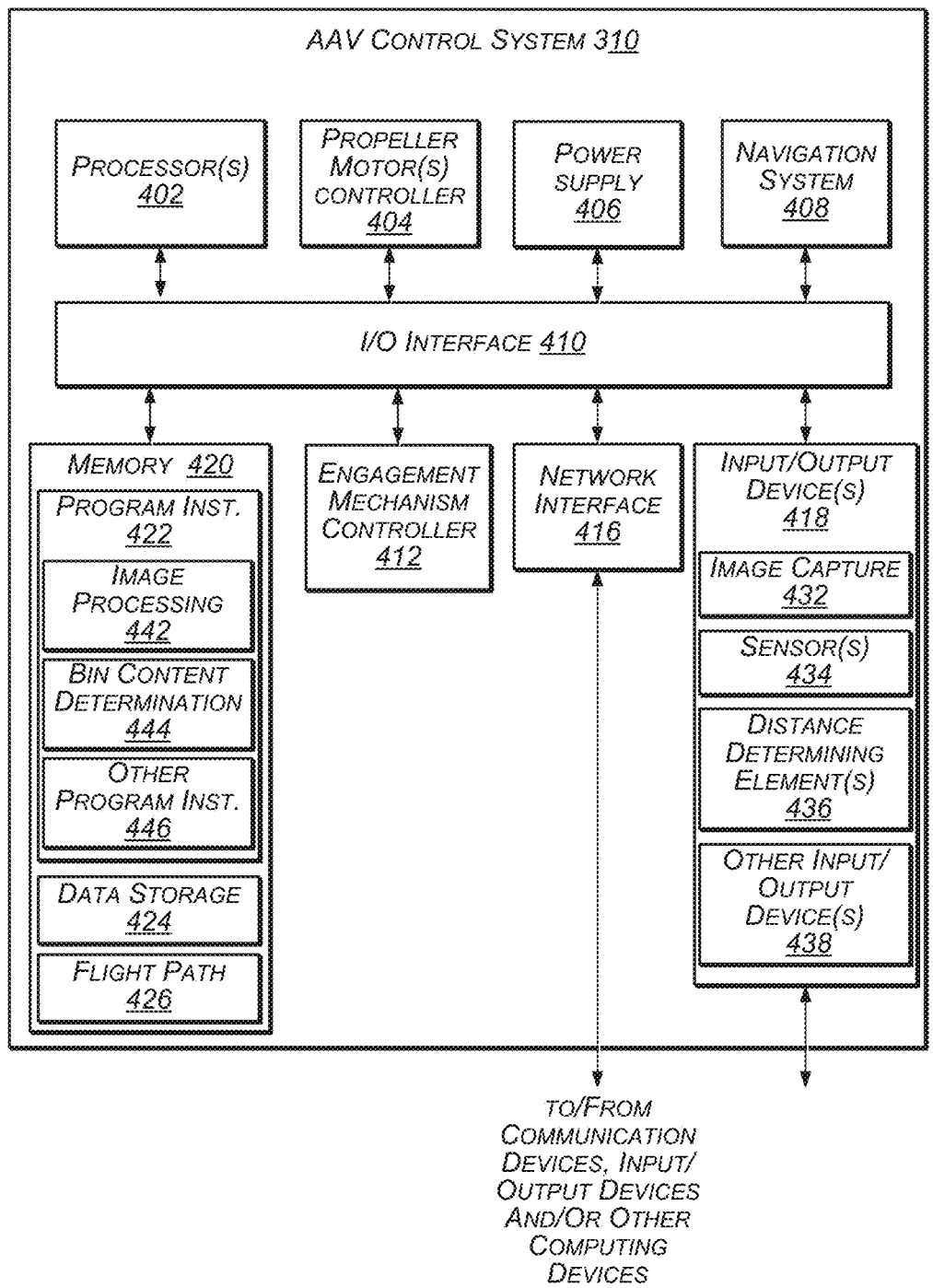
FIG. 4 is a block diagram illustrating various components of an automated aerial vehicle control system, according to an implementation.

FIG. 4 is a block diagram illustrating an example AAV control system 310 of the AAV 300. In various examples, the block diagram may be illustrative of one or more aspects of the AAV control system 310 that may be used to implement the various systems and methods discussed herein. In the illustrated implementation, the AAV control system 310 includes one or more processors 402, coupled to a non-transitory computer readable storage medium 420 via an input/output (I/O) interface 410. The AAV control system 310 may also include a propeller motor controller 404, power supply module 406 and/or a navigation system 408. The AAV control system 310 further includes an engagement mechanism controller 412, a network interface 416, and one or more input/output devices 418.

In various implementations, the AAV control system 310 may be a uniprocessor system including one processor 402, or a multiprocessor system including several processors 402 (e.g., two, four, eight, or another suitable number). The processor(s) 402 may be any suitable processor capable of executing instructions. For example, in various implementations, the processor(s) 402 may be general-purpose or embedded processors implementing any of a variety of instruction set architectures (ISAs), such as the x86, PowerPC, SPARC, or MIPS ISAs, or any other suitable ISA. In multiprocessor systems, each processor(s) 402 may commonly, but not necessarily, implement the same ISA.

The non-transitory computer readable storage medium 420 may be configured to store executable instructions, data, flight paths and/or data items accessible by the processor(s) 402. In various implementations, the non-transitory computer readable storage medium 420 may be implemented using any suitable memory technology, such as static random access memory (SRAM), synchronous dynamic RAM (SDRAM), nonvolatile/Flash-type memory, or any other type of memory. Several modules such as instruction, data stores, and so forth may be stored within the memory 420 and configured to execute on the processor(s) 402. A few example functional modules are shown stored in the memory 420, although the same functionality may alternatively be implemented in hardware, firmware, or as a system on a chip (SOC). In the illustrated implementation, program instructions and data implementing desired functions, such as those described herein, are shown stored within the non-transitory computer readable storage medium 420 as program instructions 422, data storage 424 and flight path data 426, respectively. In other implementations, program instructions, data and/or flight paths may be received, sent or stored upon different types of computer-accessible media, such as non-transitory media, or on similar media separate from the non-transitory computer readable storage medium 420 or the AAV control system 310. Generally speaking, a non-transitory, computer readable storage medium may include storage media or memory media such as magnetic or optical media, e.g., disk or CD/DVD-ROM, coupled to the AAV control system 310 via the I/O interface 410. Program instructions and data stored via a non-transitory computer readable medium may be transmitted by transmission media or signals such as electrical, electromagnetic, or digital signals, which may be conveyed via a communication medium such as a network and/or a wireless link, such as may be implemented via the network interface 416.

In various implementations, the non-transitory computer readable storage medium 420 may include program instructions 422 which may be configured to implement the example processes and/or sub-processes described herein. In this implementation, the program instructions 422 include an image processing application 442, a bin content determination application 444, and other program instructions 446. However, the AAV 300 may include any number or type of applications and is not limited to the specific examples shown here. Likewise, in some implementations, one or more of the applications may reside and be performed by a remote computing resource 110, such as the inventory management system 150. For example, the image processing application 442 and/or the bin content determination application 444 may reside in memory of the remote computing resource(s) 110 and be controlled or operated by the inventory management system 150 in response to receiving images from the AAV 300. Regardless of location, the image processing application 442. may facilitate the processing and/or correlation of images captured by the imaging components of the AAV 300.

The data storage 424 may include various data stores for maintaining data items that may be provided for determining flight paths, retrieving inventory, landing, identifying a level surface for disengaging inventory, etc. In addition, the data storage 424 may contain stored images obtained during flight, stored bin content information and/or data representative of items expected to be included in the bins. The stored bin content information and the current bin content information obtained from the image processing application 442 may be utilized by the bin content determination application 444 to determine the current bin content, as will be described in more detail below with respect to FIG. 6.

In one implementation, the I/O interface 410 may be configured to coordinate I/O traffic between the processor(s) 402, the non-transitory computer readable storage medium 420, and any peripheral devices, the network interface or other peripheral interfaces, such as input/output devices 418. In some implementations, the I/O interface 410 may perform any necessary protocol, timing or other data transformations to convert data signals from one component (e.g., non-transitory computer readable storage medium 420) into a format suitable for use by another component (e.g., processor(s) 402). In some implementations, the I/O interface 410 may include support for devices attached through various types of peripheral buses, such as a variant of the Peripheral Component Interconnect (PCI) bus standard or the Universal Serial Bus (USB) standard, for example. In some implementations, the function of the I/O interface 410 may be split into two or more separate components, such as a north bridge and a south bridge, for example. Also, in some implementations, some or all of the functionality of the I/O interface 410, such as an interface to the non-transitory computer readable storage medium 420, may be incorporated directly into the processor(s) 402.

The propeller motor(s) controller 404 communicates with the navigation system 408 and adjusts the power of each propeller motor to guide the AAV 300 along a determined flight path. The navigation system 408 may include a global positioning system (GPS), indoor positioning system (IPS), or other similar system and/or sensors that can be used to navigate the AAV 300 to and/or from a location. The engagement mechanism controller 412 communicates with the motor(s) (e.g., a servo motor) used to engage and/or disengage items. For example, when the AAV 300 is positioned over a level surface at a delivery location, the engagement mechanism controller 412 may provide an instruction to a motor that controls the engagement mechanism to release an item.

The network interface 416 may be configured to allow data to be exchanged between the AAV control system 310, other devices attached to a network, such as other computer systems (e.g., remote computing resources 110), and/or with AAV control systems of other AAVs. For example, the network interface 416 may enable wireless communication between the AAV 300 and the inventory management system 150 that is implemented on one or more of the remote computing resources 110. For wireless communication, the antenna 319 or other communication components may be utilized. As another example, the network interface 416 may enable wireless communication between numerous AAVs. The network interface 416 may also facilitate communication and detection of bay identifiers, bin identifiers, bay configuration information, content identifiers, etc. In various implementations, the network interface 416 may support communication via wireless general data networks, such as a Wi-Fi network. For example, the network interface 416 may support communication via telecommunications networks such as cellular communication networks, satellite networks, and the like.

The AAV 300 may also be equipped with multiple input/output devices 418. Any number of devices may be used. Representative devices include an image capture component 432, sensors 434, distance determining elements 436, and other input/output devices 438. The input/output devices 418 may provide additional information relating to the AAV 300 and/or images captured by the AAV 300. For example, the distance determining element 436 may be configured to determine a distance between the AAV 300 and the bays. The distance determining element may be, for example, a distance sensor, ranging laser, lidar, etc. This distance information may be used to assist in guiding the AAV 300 so that it is a known distance from the bays as the images are captured. Alternatively, or in addition thereto, the distance determining elements 436 may be used to adjust the focal length of the image capture devices so that even if the AAV 300 is at a different distance from the bays, the focal length adjustment will account for the different distances, Sensors 434 (e.g., infrared, etc.) may also be utilized to assist the flying of the AAV 300 along the flight path, as well as in the landing of the AAV 300 and in the avoiding of obstacles during flight.

While the functional components of the example AAV 300 are discussed herein as part of the AAV 300, in other implementations, one or more of the functional components may be distributed throughout the materials handling facility and/or implemented as part of the inventory management system 150. For example, one or more of the applications, such as the image processing application 442, may be implemented as part of the inventory management system 150. In such an example, when images of a bay are captured, they may be provided to the inventory management system 150 for processing.

In various implementations, the parameter values and other data illustrated herein as being included in one or more data stores may be combined with other information not described or may be partitioned differently into more, fewer, or different data structures. In some implementations, data stores may be physically located in one memory or may be distributed among two or more memories.

Those skilled in the art will appreciate that the AAV control system 310 is merely illustrative and is not intended to limit the scope of the present disclosure. In particular, the computing system and devices may include any combination of hardware or software that can perform the indicated functions, including computers, network devices, internet appliances, PDAs, wireless phones, pagers, etc. The AAV control system 310 may also be connected to other devices that are not illustrated, or instead may operate as a stand-alone system. In addition, the functionality provided by the illustrated components may in some implementations be combined in fewer components or distributed in additional components. Similarly, in some implementations, the functionality of some of the illustrated components may not be provided and/or other additional functionality may be available.

Those skilled in the art will also appreciate that, while various items are illustrated as being stored in memory or storage while being used, these items or portions of them may be transferred between memory and other storage devices for purposes of memory management and data integrity. Alternatively, in other implementations, some or all of the software components may execute in memory on another device and communicate with the illustrated AAV control system 310. Some or all of the system components or data structures may also be stored (e.g., as instructions or structured data) on a non-transitory, computer-accessible medium or a portable article to be read by an appropriate drive, various examples of which are described above. In some implementations, instructions stored on a computer-accessible medium separate from AAV control system 310 may be transmitted to AAV control system 310 via transmission media or signals such as electrical, electromagnetic, or digital signals, conveyed via a communication medium such as a wireless link. Various implementations may further include receiving, sending or storing instructions and/or data implemented in accordance with the foregoing description upon a computer-accessible medium. Accordingly, the techniques described herein may be practiced with other AAV control system configurations.

Figure 5:
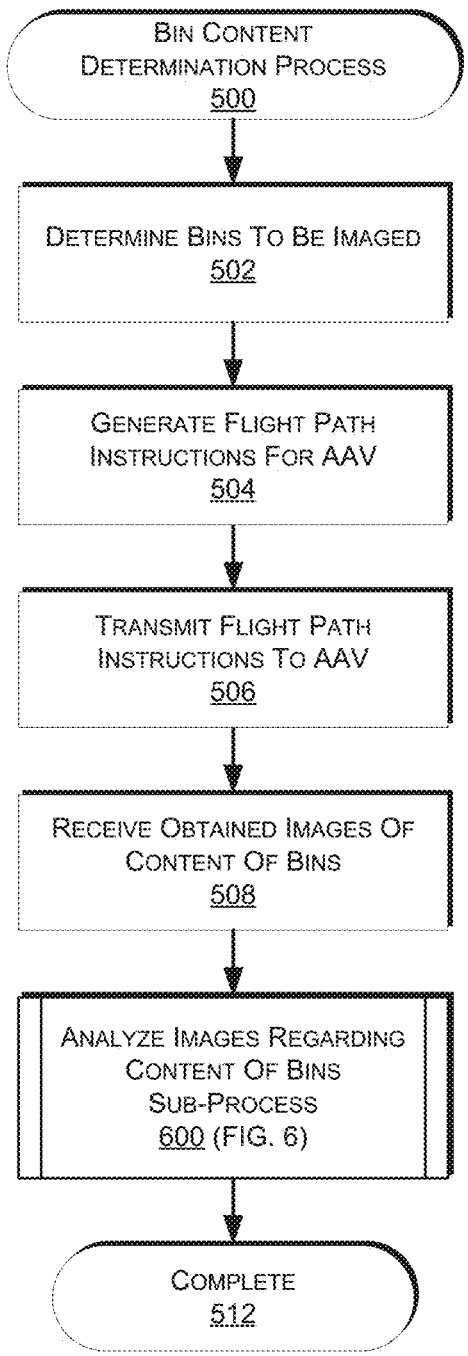
FIG. 5 depicts a flow diagram of a bin content determination process utilizing automated aerial vehicles, according to some implementations.

FIG. 5 is a flow diagram of an example bin content determination process 500 utilizing AAVs, according to some implementations. The process of FIG. 5 and each of the other processes discussed herein may be implemented in hardware, software, or a combination thereof. In the context of software, the described operations represent computer-executable instructions stored on one or more computer-readable media that, when executed by one or more processors, perform the recited operations. Generally, computer-executable instructions include routines, programs, objects, components, data structures, and the like that perform particular functions or implement particular abstract data types.

The computer-readable media may include non-transitory computer-readable storage media, which may include hard drives, floppy diskettes, optical disks, CD-ROMs, DVDs, read-only memories (ROMs), random access memories (RAMs), EPROMs, EEPROMs, flash memory, magnetic or optical cards, solid-state memory devices, or other types of storage media suitable for storing electronic instructions. In addition, in some implementations the computer-readable media may include a transitory computer-readable signal (in compressed or uncompressed form). Examples of computer-readable signals, whether modulated using a carrier or not, include, but are not limited to, signals that a computer system hosting or running a computer program can be configured to access, including signals downloaded through the Internet or other networks. Finally, the order in which the operations are described is not intended to be construed as a limitation, and any number of the described operations can be combined in any order and/or in parallel to implement the process.

The example process 500 begins with a determination of bins that are to be imaged, as in 502. For example, a current inventory assessment may be directed to all of the bins in the materials handling facility, or only a portion of the bins in certain areas, or only specific selected bins. As part of the determination of the bins, certain data regarding the locations of the bins within the materials handling facility may be provided. For example, a user interface for the inventory management system 150 may include a representation of the areas within the materials handling facility and/or may include representations of bays and bins which a user may select for inventory assessment. In various implementations, an inventory database or other inventory tracking system may also be utilized for the determination of the bins that are to be imaged. For example, a user may select certain types or areas of inventory to be assessed, or inventory may be scheduled to be assessed at periodic intervals or when certain events occur (e.g. every evening, when new inventory arrives, etc.)

Once the bins that are to be imaged are determined, flight path instructions are generated that specify a flight path an AAV will fly along and obtain images of the bins, as in 504. In various implementations, the locations of the bins to be imaged may be utilized for generating the flight path instructions. The flight path instructions may be optimized to provide the fastest possible imaging of all of the bins, and may include certain patterns. For example, the flight path instructions may include instructing the AAV to travel at different heights to progressively obtain images of bins in shelves at different heights. As another example, the flight path instructions may include instructing the AAV to obtain all of the images from a first row before progressing to a second row.

In various implementations, the flight path instructions may also be optimized based on specific objectives of the current imaging process. For example, if the purpose of the flight path instructions is to search for missing or misplaced inventory, a checkerboard pattern may he utilized to detect more common mistakes, such as an item placed in a bin that is next to, or above or below, the bin where the item was expected to be placed. In various implementations, the flight path instructions may also be optimized so as to focus more on higher need or problem areas. For example, in a given materials handling facility, certain areas may be known to have a statistically greater occurrence of inventory turnover, inaccuracies or other occurrences requiring more detailed and/or frequent inventory assessment.

Once the flight path instructions are generated, the flight path instructions are transmitted to the AAV, as in 506. For example, the inventory management system 150 may wirelessly transmit the flight path instructions to the AAV. During or after the flying of the flight path by the AAV. the obtained images of the content of the bins are received, as in 508. For example, the inventory management system 150 may receive the images as wirelessly transmitted from the AAV over the network of the remote computing resources 110, either during or after the time when the AAV is flying along the flight path. As another example, after the AAV lands, the AAV may have a physical data connection at the landing area and/or a memory device that may be removed from the AAV and utilized to transfer the images to the inventory management system 150. In one implementation, an engagement mechanism of the AAV may be utilized to drop off an imaging/memory device with stored images to be downloaded and then pick up an empty imaging/memory device for filling up with new images.

In some implementations, the example process may also receive from the AAV location and/or time stamp information identifying the location of the AAV and timing regarding the location of the AAV when the images were captured. As an alternative or in addition thereto, other forms of location information may be provided by the AAV. For example, indoor position information may be obtained and provided with the captured images. As another alternative or in addition thereto, the bays and bins themselves may include visual identifiers (barcodes, bokodes, QR codes, colors, shapes, characters, images, sizes, or any other characteristics of or on the bays or bins) that can be used to determine the bin identity and/or location within the bay, and which may be used to determine which images correspond with which bins of the bay. Once the images are received, a sub-process is performed for analyzing the images regarding the content of the bins, as in 600, after which the example process completes, as in 512. The image analysis sub-process 600 is discussed in more detail below with respect to FIG. 6.

Figure 6:
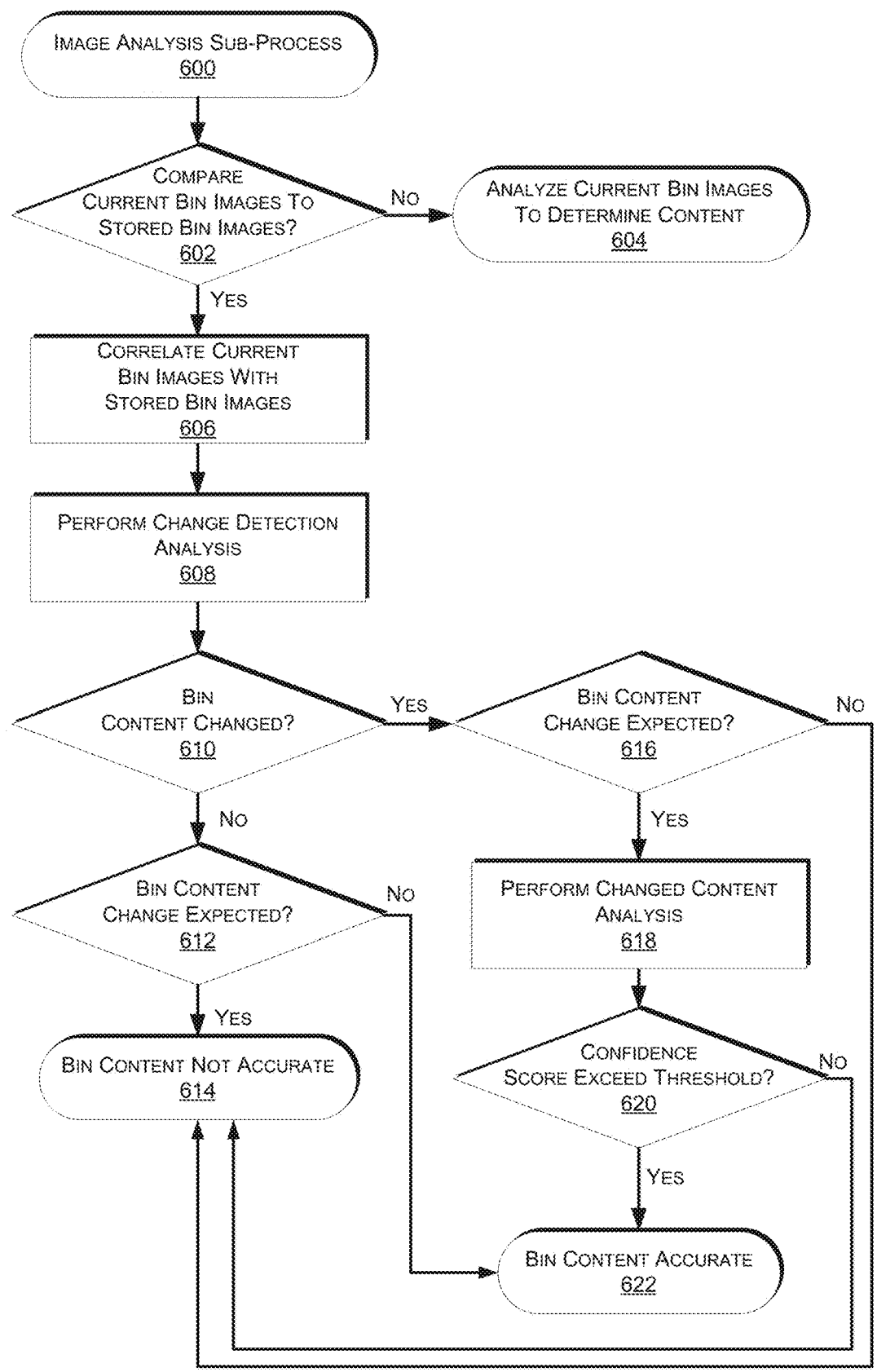
FIG. 6 depicts a flow diagram of an image analysis sub-process for determining bin content, according to some implementations.

FIG. 6 depicts a flow diagram of an example image analysis sub-process 600 for determining bin content, according to some implementations. The example process begins by determining whether or not the current bin images received at block 508 of FIG. 5 will be compared to stored bin images, as in 602. If the current bin images will not be compared to stored bin images, the current bin images are analyzed independently to determine bin content, as in 604. In various implementations, the content of the bins may be determined through a computer imaging program. In addition, in one implementation the computer imaging program may include machine learning for content determination, and/or may search for visual identifiers (e.g., barcodes, bokodes, QR codes, colors, shapes, characters, images, sizes, or any other characteristics of or on the inventory items) that can be used to determine the content of the bin. In an implementation where machine learning is utilized, human agents may review the images and content determinations until the process achieves sufficient accuracy. A confidence score may be associated with the content determinations in order to target agent review more efficiently. For example, content determinations with low confidence scores may be sent for agent review while those with high confidence scores may not be sent for review.

If it is determined that the current bin images will be compared to stored bin images for the analysis, as in 602, the current bin images are correlated with stored bin images, as in 606. Stored bin images are images of bins that were previously captured, associated with the bins and stored in the bin content data store. For example, the example process 500 of FIG. 5 may be performed periodically (e.g., nightly) and current bin images may be captured and stored in the bin content data store. When those current bin images are stored they become stored bin images and may be used for comparison during subsequent execution of the example image analysis sub-process 600.

To correlate the bin images, a bin represented in a current bin image may be determined and associated with the current bin image. As described above, the bin may be identified based on, for example, the location information provided by the AAV with the current bin image and/or by processing the image to identify one or more bin and/or bay identifiers. For example, as described above, visual bin identifiers and/or bay identifiers may be included in the current bin image. Object and/or character recognition algorithms may be utilized to identify the visual bin identifiers and/or bay identifiers and used to identify the bin represented in the image.

Utilizing the correlated current bin images and the stored bin images, a change detection analysis is performed, as in 608. In one implementation, the change detection analysis may begin by parsing the current bin images into segments or other divisible units (e.g., cells). For example, each pixel of an image may be parsed using a 5×5 grid pattern. For each grid pattern, a feature vector representative of the colors, shapes, etc. included in the grid is generated. In some implementations, edge detection, scale-invariant feature transformation (SIFT), object detection, color detection, and/or other techniques may be used to generate feature vectors for an image. The feature vectors of a current bin image may then be compared to feature vectors of the stored bin image to generate a difference score. The difference score may be high if new feature vectors are detected as a result of an item being added to the bin and/or as a result of an item being removed from the bin. For example, if an item is added to the bin, the pixels of the image that represent that item of content will generate feature vectors that do not correspond with any of the feature vectors of the stored bin image, thereby resulting in a high difference score. Likewise, if an item is removed, the empty space will result in feature vectors that are not generated by the stored bin images, again resulting in a high difference score when the feature vectors of the images are compared. In one implementation, the difference score may be representative of the difference between all feature vectors of the current bin image compared to all the feature vectors of the stored bin image.

Based on the results of the change detection analysis, a determination is made as to whether the content of the bin has changed, as in 610. In one implementation, the determination may be based on comparing the difference score from the change detection analysis to a difference threshold which indicates if the content of the bin has changed. As noted above, bin content may change, for example, if an item of content is added to the bin or if an item of content is removed from the bin. In one implementation, the change detection analysis may also provide an indication of an area of the image and/or bin that appears to include a change.

If it is determined that the bin content has changed, a determination is made as to whether the bin content was expected to change, as in 616. For example, if the inventory management system provided an instruction to an agent to pick an item from the content of the bin and that pick was to occur after the time that the stored bin image was captured but before the time that the current bin image was captured, it is determined that a change to the content was expected to occur. Likewise, if the inventory management system provided an instruction to an agent to stow an item in the bin and that stow was to occur after the time that the stored bin image was captured but before the time that the current bin image was captured, it is determined that a change to the content was expected to occur.

If it is determined that the bin content was expected to change, a changed content analysis is performed, as in 618. The changed content analysis determines if the actual change to the content of the bin corresponds with the expected change to the content of the bin. In one implementation, the changed content analysis may begin by determining if an item addition was expected for the bin, in which case feature vectors representative of the item expected to have been added may be obtained. The features vectors of the changed area of the bin image and the expected item feature vectors may then be compared, and based on the comparison, a confidence score may be generated based on the similarity of the feature vectors. For example, if the feature vectors match, or are very close to matching, a high confidence score may be provided. As a similar process, if an item was expected to be removed from the bin, feature vectors of the item expected to have been removed may be obtained. The features vectors of the current image may then be compared with the feature vectors of the item to determine if those feature vectors are not present in the current bin image. Based on a comparison of the feature vectors, a confidence score may be generated.

Based on the confidence score from the changed content analysis, a determination is made as to whether the confidence score exceeds a confidence threshold, as in 620. The confidence threshold may be any defined score for determining if the actual change to the bin content corresponds with the expected change to the bin content. For example, the confidence threshold may be defined at 95% such that the confidence score must be higher than 95% before the example process will determine that the actual change to the bin content corresponds to the expected change of the bin content.

If it is determined that the confidence threshold has been exceeded by the confidence score, the bin content is considered accurate and not in need of review by an agent, as in 622. However, if it is determined that the confidence threshold is not exceeded, or if it is determined at decision block 616 that the bin content was not expected to change, it is determined that the bin content is considered not accurate and an agent is scheduled to review the content of the bin, as in 614. In some implementations, an agent may review the current bin images and/or the stored bin images to determine if the bin content is accurate. In another implementation, the agent may physically view the bin content.

Returning to decision block 610, if it is determined that the bin content did not change, a determination is made as to whether the bin content was expected to change, as in 612. If it is determined that the bin content was expected to change, it is determined that the bin content is not accurate and an agent is instructed to review the bin content, as in 614. However, if it is determined that the bin content was not expected to change, it is determined that the bin content is accurate and agent review of the bin is not needed, as in 622.

Figure 7:
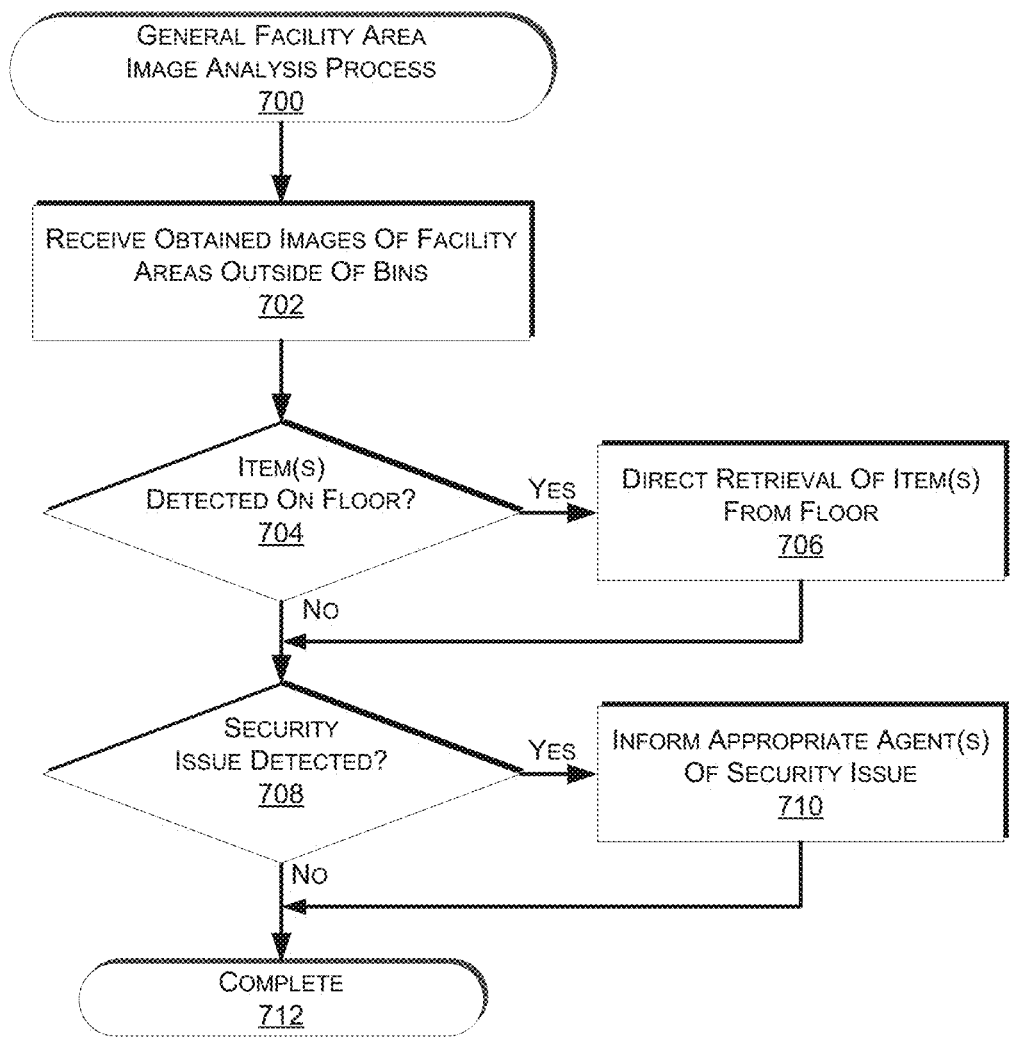
FIG. 7 depicts a flow diagram of a general facility area image analysis process, according to some implementations.

FIG. 7 is a flow diagram illustrating an example process 700 for analyzing images of general facility areas outside of the bins. The example process begins with the receipt of obtained images of facility areas outside of the bins, as in 702. In various implementations, AAVs may be programmed to take continuous video or sequences of images outside of the bins. For example, images of corridors, floors, etc. may be obtained. Once the images of the facility areas outside of the bins are received, a determination is made as to whether items are detected on the floor, as in 704. For example, items may he accidentally dropped or knocked out of bins during inventory procedures by agents, automated machinery, etc. If items are detected on the floor, retrieval of the items from the floor is directed, as in 706. For example, upon analysis of the images, if the inventory management system 150 determines that items are on the floor, a message may be sent to an agent to retrieve the items, which may be returned to the proper bins, or otherwise removed to an appropriate area. In one implementation, the AAV that is performing the imaging may have an engagement mechanism that may be utilized to retrieve an item from the floor.

The images may also be analyzed to determine if any security issues are detected, as in 708. For example, analysis may be performed to determine if smoke, fire, other hazards, etc. are detected. In addition, security video may be analyzed for the tracking of products in transit, human movement patterns, machine movements, etc. For example, if a particular area of the materials handling facility is known to have certain issues (e.g., missing items, misplaced items, damaged items, unexpected time delays, unauthorized people in certain areas, etc.), the images may be analyzed to attempt to determine a cause.

If a security issue is detected, steps may be taken to inform appropriate agents of the security issue, as in 710. For example, detection of certain types of security issues (e.g., smoke, fire, etc.) may trigger an automatic alert or call to appropriate agents and/or a tire department by the inventory management system 150. As another example, other types of detected security issues (e.g., relating to missing items) may be sent to security agents of the materials handling facility for further review. If no security issues are detected, the example process completes, as in 712.

Figure 8:
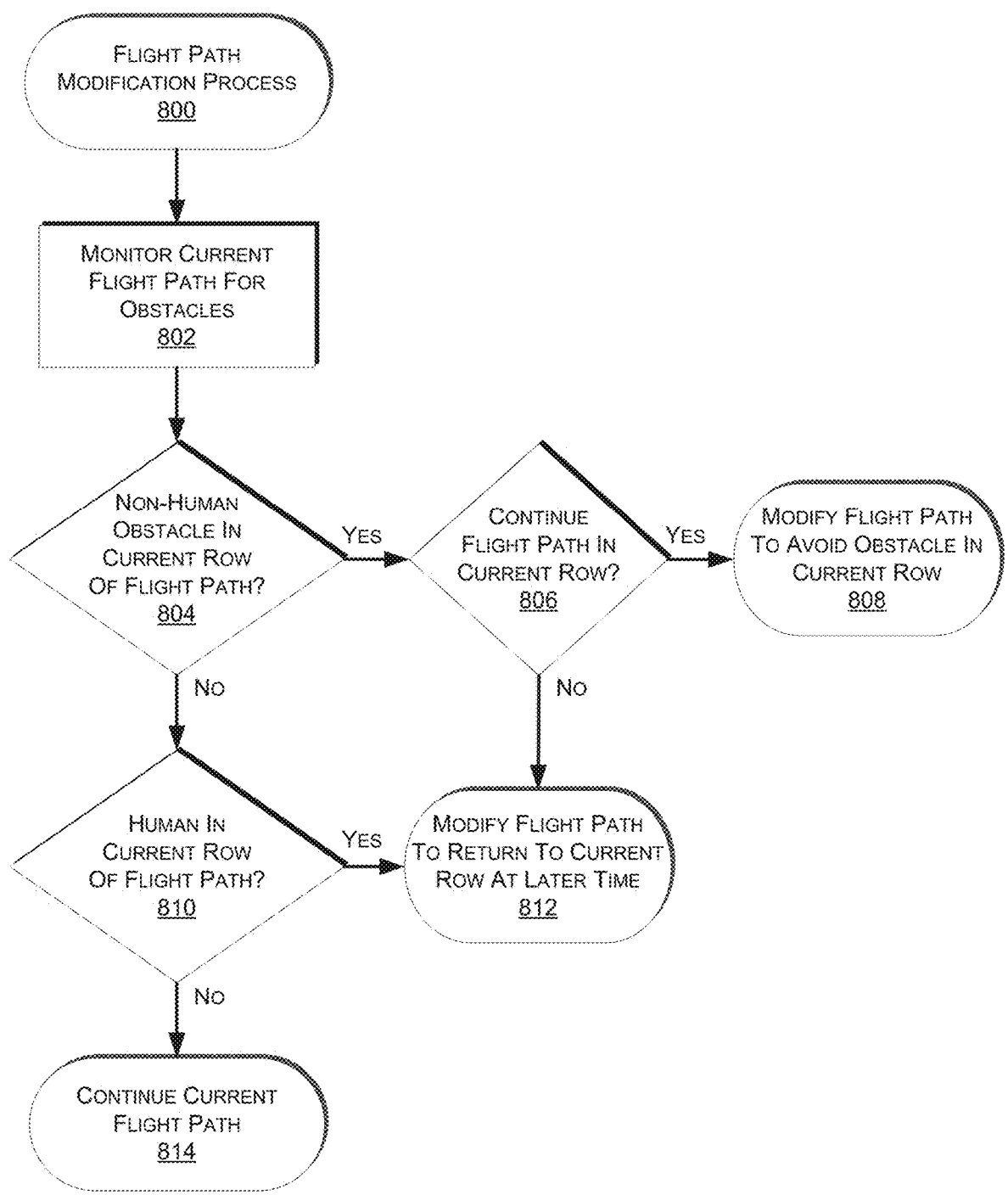
FIG. 8 depicts a flow diagram of a flight path modification process, according to some implementations.

FIG. 8 is a flow diagram illustrating an example process 800 for modifying a flight path of an AAV. The example process begins by monitoring a current flight path for obstacles, as in 802. In various implementations, the monitoring may include receiving input from various sensors included in the AAV and/or the materials handling facility, such as cameras, video, lidar, infrared, etc. As the monitoring is performed, a determination is made as to whether a non-human obstacle is present in the current row of the flight path, as in 804. For example, various objects may be in the current row of the flight path such as signs, walls, bays, etc. If such an obstacle is present in the current row of the flight path, a determination is made whether the current flight path in the row should be continued, as in 806. If the flight path is to be continued in the current row, the flight path is modified to avoid the obstacle and the flight path is continued, as in 808. For example, the flight path of the AAV may be modified to fly over, under or around the current obstacle, while still obtaining images of the bins in the current row. If the obstacle prevents the imaging of certain bins, a report may be provided from the AAV to the inventory management system.

A determination may also be made as to whether there is any human presence in the current row of the flight path, as in 810. In various implementations, an obstacle that is detected may be determined to be a human in accordance with a human detection process. For example, a human detection process may utilize any applicable type of sensors (e.g., visual, infrared, thermal imaging, range sensing, etc.) along with appropriate processing software to determine if an obstacle is human. For example, if thermal imaging is used, a heat signature generated by the presence of a human in the row may be detected and a determination made that a human (or other living organism) is present. As another example, known dimensions and structures (e.g., of a floor area or other region) may be compared to current measurements and/or images to evaluate whether a detected object and/or movements are determined to be human. If it is determined that there is no human in the current row of the flight path, the current flight path is continued, as in 814. If it is determined that there is a human in the current row of the flight path, as in 810, or if the flight path is not to be continued in the current row due to a non-human obstacle, as in 806, the flight path is modified to return to the current row at a later time, as in 812. For example, the flight path may be modified to return to the current row at a later time in accordance with instructions received from a remote computing resource. As another example, stored program instructions may be contained in a memory of the AAV which modify the flight path to return to the current row at a later time when a human is detected. It will be appreciated that by modifying the flight path to return to the current row at a later time, no risk is posed to a human working in the same area where an AAV is obtaining images of bins.

Figure 9:
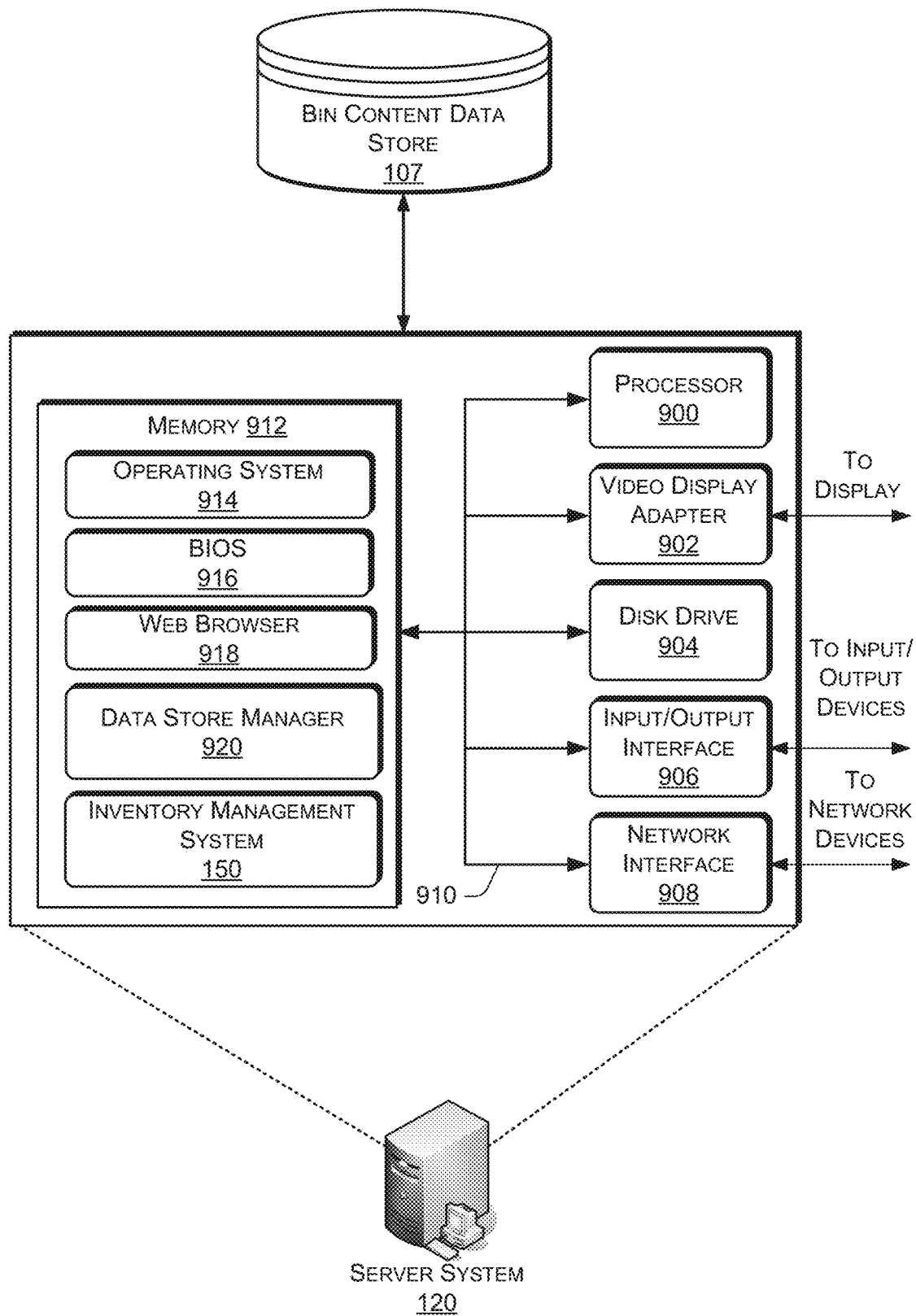
FIG. 9 is a block diagram of an illustrative implementation of a server system that may be used with various implementations.

FIG. 9 is a pictorial diagram of an illustrative implementation of a server system, such as the server system 120, that may be used in the implementations described herein. The server system 120 may include a processor 900, such as one or more redundant processors, a video display adapter 902, a disk drive 904, an input/output interface 906, a network interface 908, and a memory 912. The processor 900, the video display adapter 902, the disk drive 904, the input/output interface 906, the network interface 908, and the memory 912 may be communicatively coupled to each other by a communication bus 910.

The video display adapter 902 provides display signals to a local display (not shown in FIG. 9) permitting an agent of the server system 120 to monitor and configure operation of the server system 120 and/or to resolve differences between stored bin content information and current bin content information received from images captured by an AAV 300. The input/output interface 906 likewise communicates with external input/output devices not shown in FIG. 9, such as a mouse, keyboard, scanner, or other input and output devices that can be operated by an agent of the server system 120. The network interface 908 includes hardware, software, or any combination thereof, to communicate with other computing devices. For example, the network interface 908 may be configured to provide communications between the server system 120 and other computing devices, such as the AAV 300, via a network.

The memory 912 generally comprises random access memory (RAM), read-only memory (ROM), flash memory, and/or other volatile or permanent memory. The memory 912 is shown storing an operating system 914 for controlling the operation of the server system 120. A binary input/output system (BIOS) 916 for controlling the low-level operation of the server system 120 is also stored in the memory 912.

The memory 912 additionally stores program code and data for providing network services to the AAV 300 and/or the inventory management system 150. Accordingly, the memory 912 may store a browser application 918. The browser application 918 comprises computer executable instructions, that, when executed by the processor 900, generate or otherwise obtain configurable markup documents such as Web pages. The browser application 918 communicates with a data store manager application 920 to facilitate data exchange between the bin content data store 107 and the inventory management system 150.

As used herein, the term "data store" refers to any device or combination of devices capable of storing, accessing and retrieving data, which may include any combination and number of data servers, databases, data storage devices and data storage media, in any standard, distributed or clustered environment. The server system 120 can include any appropriate hardware and software for integrating with the data store 107 as needed to execute aspects of one or more applications for the AAV 300, and/or the inventory management system 150.

The data store 107 can include several separate data tables, databases or other data storage mechanisms and media for storing data relating to a particular aspect. For example, the illustrated data store 107 includes mechanisms for maintaining inventory information, bay location information, bin content information, images of the bay, etc., which can be used to generate and deliver information to AAVs 300, the inventory management system 150 and/or agents.

It should be understood that there can be many other aspects that may be stored in the data store 107 and that additional data stores beyond the one illustrated may be included. The data store 107 is operable, through logic associated therewith, to receive instructions from the server system 120 and obtain, update or otherwise process data in response thereto.

The memory 912 may also include the inventory management system 150, discussed above. The inventory management system 150 may be executable by the processor 900 to implement one or more of the functions of the server system 120. In one implementation, the inventory management system 150 may represent instructions embodied in one or more software programs stored in the memory 912. In another implementation, the inventory management system 150 can represent hardware, software instructions, or a combination thereof.

The server system 120, in one implementation, is a distributed environment utilizing several computer systems and components that are interconnected via communication links, using one or more computer networks or direct connections. However, it will be appreciated by those of ordinary skill in the art that such a system could operate equally well in a system having fewer or a greater number of components than are illustrated in FIG. 9. Thus, the depiction in FIG. 9 should be taken as being illustrative in nature and not limiting to the scope of the disclosure.

Although the subject matter has been described in language specific to structural features and/or methodological acts, it is to be understood that the subject matter defined in the appended claims is not necessarily limited to the specific features or acts described. Rather, the specific features and acts are disclosed as exemplary forms of implementing the claims.

What is claimed is:

1. A system to determine content included in a plurality of bins in a materials handling facility, the system comprising: an automated aerial vehicle, comprising:
    an imaging device; and
    a power supply connected to the imaging device and configured to provide power to the imaging device; and
a computing system, comprising:
    one or more processors; and
    a memory coupled to the one or more processors and storing program instructions that when executed by the one or more processors cause the one or more processors to at least:
        send instructions to the automated aerial vehicle to follow a flight path inside a materials handling facility;
        send instructions to the automated aerial vehicle to obtain a plurality of images of bins located within the materials handling facility as the automated aerial vehicle follows the flight path; and
        for each image of the plurality of images:
            process the image to determine a bin represented in the image;
            correlate the image with the determined bin represented in the image; and
            analyze the image to determine content included in the bin.

2. The system of claim 1, wherein the analysis of the images is performed at least in part by a computer imaging program.

3. The system of claim 1, wherein at least some of the content is determined based on identifications of identifiers on items included in the bins.

4. The system of claim 3, wherein the identifiers include at least one of a barcode, a QR code, or a bokode.

5. The system of claim 1, wherein at least some of the processing to determine bins is based on identifications of bin identifiers.

6. The system of claim 5, wherein the bin identifiers include at least one of a barcode, a QR code, or a bokode.

7. The system of claim 1, wherein the automated aerial vehicle further comprises a navigation system with an indoor positioning system that is utilized to navigate the automated aerial vehicle along the flight path within the materials handling facility and which provides indoor position information that indicates the location within the materials handling facility of the automated aerial vehicle when each image is obtained.

8. A computer-implemented method to determine content of a plurality of bins within a materials handling facility, the computer-implemented method comprising:
    under control of one or more computing systems configured with executable instructions,
        sending instructions to an automated aerial vehicle to follow a flight path inside a materials handling facility to obtain a plurality of images of bins located within the materials handling facility;
        receiving the plurality of images taken from the automated aerial vehicle as the automated aerial vehicle flies along the flight path; and
        for each image of the plurality of images:
            determining a bin represented in the image;
            correlating the image with the determined bin represented in the image; and
            analyzing the image to determine content included in the bin.

9. The computer-implemented method of claim 8, further comprising receiving with the plurality of images indoor position information provided by an indoor positioning system that is utilized to navigate the automated aerial vehicle to and from locations within the materials handling facility.

10. The computer-implemented method of claim 9, wherein the indoor position information that is received indicates the location of the automated aerial vehicle within the materials handling facility when each image is obtained.

11. The computer-implemented method of claim 10, wherein the determination of the bin represented in each image is based at least in part on the indoor position information that is received with each image.

12. The computer-implemented method of claim 8, wherein the flight path includes the automated aerial vehicle flying at different heights and progressively obtaining images of bins in shelves at the different heights.

13. The computer-implemented method of claim 12, wherein the plurality of images are captured at a frequency for which at least some of the images of the bins in a first shelf of a first bay overlap and when viewed together provide a full horizontal image of the first shelf of the first bay.

14. The computer-implemented method of claim 12, wherein the plurality of bins are located in bays that are arranged in rows, and the flight path further includes the automated aerial vehicle flying along a first row for imaging all of the bins of the plurality of bins in the first row before progressing to a second row.

15. A computer-implemented method, comprising:
under control of one or more computing systems configured with executable instructions,
sending instructions to an automated aerial vehicle to follow a flight path inside a materials handling facility;
sending instructions to the automated aerial vehicle to obtain a plurality of images of bins located within the materials handling facility as the automated aerial vehicle follows the flight path; and
for each image of the plurality of images:
determining a bin represented in the image;
correlating the image with the determined bin represented in the image; and
analyzing the image to determine content included in the bin.

16. The computer-implemented method of claim 15, wherein the determining of the bins represented in the images comprises analyzing the images to determine the bins represented in the images.

17. The computer-implemented method of claim 16, wherein at least some of the analysis to determine bins is based on identifications of bin identifiers, for which the bin identifiers include at least one of a barcode, a QR code, or a bokode.

18. The computer-implemented method of claim 15, wherein the determining of the bins represented in the images comprises receiving information from an active identifier reader on the automated aerial vehicle which is utilized to detect radio frequency identifier tags or other active identifiers for identifying the bins.

19. The computer-implemented method of claim 15, further comprising receiving with the plurality of images indoor position information provided by an indoor positioning system that is utilized to navigate the automated aerial vehicle within the materials handling facility, wherein the indoor position information indicates the location of the automated aerial vehicle within the materials handling facility when each image is obtained.

20. The computer-implemented method of claim 19, wherein the determining of the bins represented in the images is based at least in part on the indoor position information that is received with each image.

* * * * *